United States Patent
Nishimura et al.

(10) Patent No.: US 7,540,736 B2
(45) Date of Patent: Jun. 2, 2009

(54) SAFETY DOOR DEVICE OF INJECTION MOLDING MACHINE

(75) Inventors: Koichi Nishimura, Yamanashi (JP); Koji Shima, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 17 days.

(21) Appl. No.: 12/017,036

(22) Filed: Jan. 20, 2008

(65) Prior Publication Data
US 2008/0263961 A1    Oct. 30, 2008

(30) Foreign Application Priority Data
Feb. 5, 2007    (JP)    .............................. 2007-026021

(51) Int. Cl.
*B29C 45/84*    (2006.01)
(52) U.S. Cl. .................................... 425/151
(58) Field of Classification Search ................ 425/151, 425/152, 153, DIG. 45
See application file for complete search history.

(56) References Cited

U.S. PATENT DOCUMENTS 5,017,121 A * 5/1991 Hehl .......................... 425/151
5,277,568 A * 1/1994 Hirata et al. ................. 425/151

FOREIGN PATENT DOCUMENTS

| JP | 55058321 U | 4/1980 |
| JP | 64-036425 A | 2/1989 |
| JP | 06099469 A | 4/1994 |
| JP | 2002-187184 A | 7/2002 |

OTHER PUBLICATIONS

EP Search Report for EP08100502.7 dated Jun. 27, 2008.

* cited by examiner

*Primary Examiner*—James Mackey
(74) *Attorney, Agent, or Firm*—Lowe, Hauptman, Ham & Berner, LLP

(57) ABSTRACT

A safer safety door, provided at low cost and imposing little burden on an operator. A primary safety door with a top and a secondary safety door are provided on a clamping unit. The primary safety door and the secondary safety door abut each other at abutting portions provided on each safety door. The secondary safety door has an engaging member that swings along a guide member. The engaging member has a hinge bent in one direction. When both safety doors are closed, the primary safety door can be freely opened and closed independently. When the secondary safety door is opened, both safety doors are linked together and move as a single body. In the state where the primary and secondary safety doors are opened separately, when the primary safety door is moved to be closed, the hinge member bends and both safety doors are linked together as a unit.

4 Claims, 5 Drawing Sheets

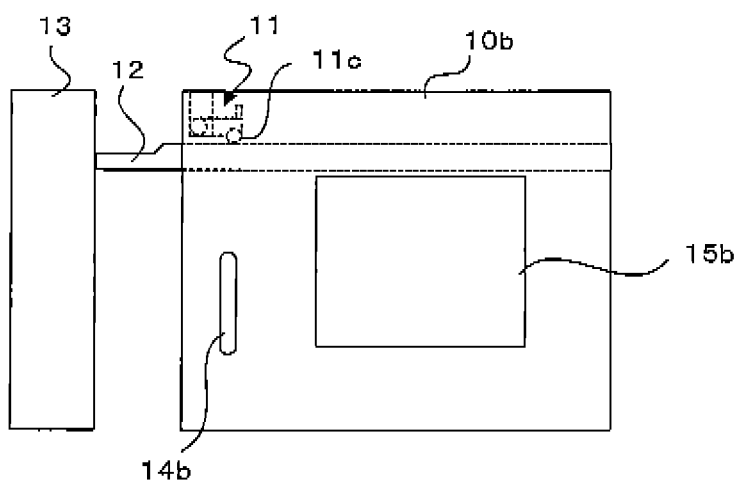
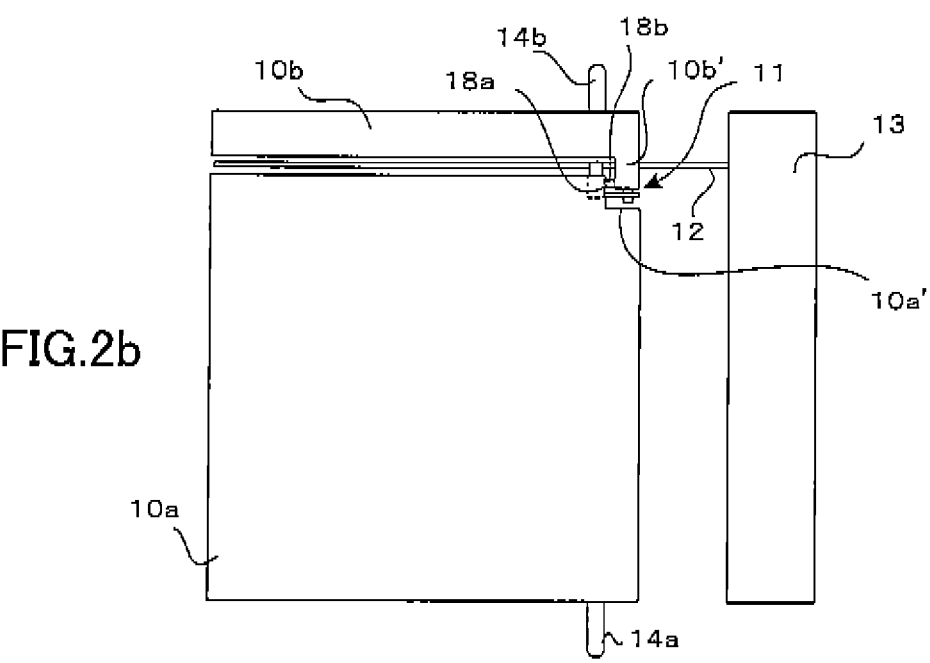
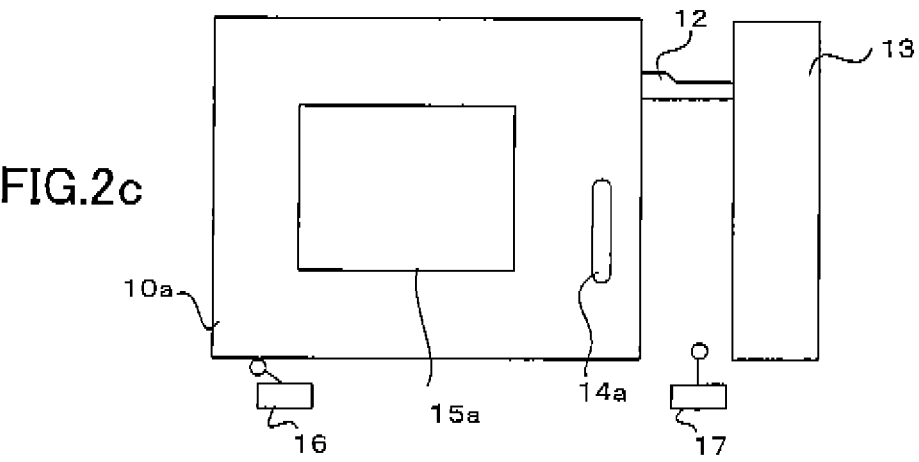

SAFETY DOOR DEVICE OF INJECTION MOLDING MACHINE

The present application is based on, and claims priority from, Japanese Application Number 2007-026021, filed Feb 5, 2007, the disclosure of which is hereby incorporated by reference herein in its entirety.

BACKGROUND OF THE INVENTION

1. Field of the Invention

The present invention relates to a safety door device provided on a mold clamping unit of an injection molding machine.

2. Description of the Related Art

In an injection molding machine, a clamping unit moves a movable mold mounted on a movable platen against a stationary mold mounted on a stationary platen, closes the molds, and injects resin into the molds, after which the clamping unit is moved, the molds opened, and the molded article removed. When mounting the molds on the clamping unit, when performing maintenance on the clamping unit, and further, when removing the molded article manually, it is necessary to be able to access the clamping unit from the outside. However, since the clamping unit is designed to open and close the molds, there is a risk of an operator getting a hand caught in the molds. Accordingly, as a precaution a safety door is provide on the clamping unit and configured in such a way that the clamping unit can only move when the safety door has closed the clamping unit.

Usually, a safety door is provided on both a front side, that is, an operation side where an operator mainly operates, and a rear side opposite the front side of the clamping unit. In order to ensure safety, it is necessary to provide switches that detect opening and closing of the safety doors on both the operation side safety door and the safety door on the side opposite the operation side. In order to prevent an increase in cost brought about by providing detection switches for each of the safety doors, some injection molding machines integrate the operation side safety door and the safety door on the side opposite the operation side into a single body, thus reducing the number of detection switches. However, such a single body structure increases the mass of the safety door, which is undesirable in that the safety door is opened and closed repeatedly when removing molded articles from the mold manually and thus imposes an undue burden on the operator.

Consequently, in an attempt to provide safety while at the same time reducing the burden on the operator, safety doors in which the operation side safety door can be opened and closed independently of the rear door are known.

For example, a safety door construction is known in which a rotary shaft is provided between the operation side safety door and the safety door on the side opposite the operation side, such that, when the operation side safety door is locked, the rotary shaft cannot rotate and thus the safety door on the side opposite the operation side cannot be opened. When the operation side safety door is not locked, the operation side safety door can be freely opened and closed. However, when the safety door on the side opposite the operation side is opened, the rotary shaft rotates, opening the operation side safety door a predetermined distance only, and when the safety door on the side opposite the operation side is open the operation side safety door is always open, and further, only when the safety door on the side opposite the operation side is closed can the operation side safety door be completely closed (see, for example, JP2002-187184A).

Moreover, a safety door construction is also known in which brackets are projected from each of the operation side safety door and the safety door on the side opposite the operation side, respectively, the bracket from the safety door on the side opposite the operation side is disposed rearward of the bracket of the operation side safety door (on a side at which the door closes), such that, when the operation side safety door is closed the safety door on the side opposite the operation side also closes. The operation side safety door can be opened independently, but when the safety door on the side opposite the operation side is opened the operation side safety door also opens order to ensure safety (see JP55-58321U).

Further, an invention in which a coupling mechanism that links the operation side safety door and the safety door on the side opposite the operation side together manually, such that when the operation side safety door and the safety door on the side opposite the operation side are coupled by the coupling mechanism both safety doors move together, and when the coupling is released both doors can be freely opened and closed independently, is also known (JP64-36425A).

Arrangements in which, in an injection molding machine having a operation side safety door and a safety door on the side opposite the operation side, when the operation side safety door can be freely opened and closed independently, and further, when the operation side safety door is shut, the safety door on the side opposite the operation side also is always shut as well in order to provide safety, and at the same time reduce the burden on the operator, are well known as described above. However, there are drawbacks to the above-described approaches.

For example, in the invention described in JP2002-187184A, even when the safety door on the side opposite the operation side is wide open, because the angle of the rotary shaft does not increase beyond a certain angle, the operation side safety door does not open further than that angle, and moreover, even when the safety door on the side opposite the operation side is closed, the operation side safety door cannot be closed.

In addition, in the invention described in JP55-58321U, when the safety door on the side opposite the operation side is opened and the safety door on the side opposite the operation side stopped after bracket impact, even though the motion of the safety door on the side opposite the operation side is stopped the operation side safety door continues to move by inertia, such that the operation side safety door is an in uncontrolled state, and consequently, safety cannot be achieved.

In the invention described in JP64-36425A, if the operation side safety door and the safety door on the side opposite the operation side are linked by the coupling mechanism, both safety doors move as a single body, and consequently, safety can be achieved without entering an uncontrolled state. Further, if the coupling is released, both safety doors can each be opened and closed independently, thus reducing the burden on the operator. However, the coupling mechanism must be operated manually, and further, since the structure is such that both safety doors can open and close separately, it is necessary to provide detection switches to detect opening and closing of both safety doors in order to provide safety, which increases costs.

SUMMARY OF THE INVENTION

The present invention provides a safer safety door device of an injection molding machine without increasing costs, and further, without increasing the burden on the operator.

A safety door device of the present invention comprises: a primary safety door provided slidably to be opened/closed on a front side of an injection molding machine and having a first abutting member; a secondary safety door provided slidably to be opened/closed on a rear side of the injection molding machine and having a second abutting member, the first and second abutting members being abutting each other when the secondary safety door is opened so that the primary safety door opens together with the secondary safety door, and the first and second abutting members being abutting each other when the primary safety door is closed so that the secondary safety door closes together with the primary safety door; an engaging portion provided at the primary safety door; and an engaging member provided at the secondary safety door that engages/disengages with the engaging portion of the primary safety door, the engaging member being in a state unable to engage with the engaging portion when the secondary safety door is closed and being in a state able to engage with the engaging portion when the secondary safety door is opened, wherein the primary safety door and the secondary safety door are coupled with each other by engagement of the engaging member and the engaging portion when the first abutting member is brought closer to the second abutting member within a predetermined distance, with the engaging member being in the state able to engage with the engaging portion.

A guide member for guiding the engaging member may be provided in a sliding direction of the secondary safety door, so that the engaging member is brought into the state unable to engage with the engaging portion and the state able to engage with the engaging portion as guided by the guide member.

The engaging member may comprise a lever that swings as guided by the guide member and a hinge provided at a distal end of the lever to swing to a protruding position by an urging force. In this arrangement, the hinge is swung by the engaging portion to pass the engaging portion when the first abutting member is moved relative to the second abutting member in a direction to abut each other, and is not swung by the engaging portion that is passed by the hinge when the first abutting member is move relative to the second abutting member in a direction remote from each other, with the engaging member in the state able to engage with the engaging portion.

The engaging member may comprise a lever that swings as guided by the guide member and a projection provided at a distal end of the lever, and the engaging portion may comprise a swingable member that swings to a protruding position by an urging force. In this arrangement, the swingable member is swung by the projection to pass the projection when the first abutting member is move relative to the second abutting member in a direction to abut each other, and is not swung by the projection that is passed by the swingable member when the first abutting member is moved relative to the second abutting member in a direction remote from each other, with the engaging member in the state able to engage with the engaging portion.

When the secondary safety door is closed shut, the primary safety door can be freely opened and closed independently of the secondary safety door so that there is no great burden on the operator. When the secondary safety door is open, the primary safety door is always open to provide safety. Further, both the primary safety door and the secondary safety door can be opened and closed separately; alternatively, the primary safety door and the secondary safety door can be moved together as a single body. In addition, if the primary safety door is closed shut then the secondary safety door is also always closed shut, and if the secondary safety door is opened in a state in which both the primary safety door and the secondary safety door are closed shut, the primary safety door opens, and further, in this case, the primary safety door and the secondary safety door are coupled together and move as a single body. Therefore, the primary safety door, which is not being operated, does not continue to move by itself under inertia, and the operation of the primary safety door can also be controlled by operation of the secondary safety door so that safety can be achieved.

When either the primary safety door or the secondary safety door is operated alone and both safety doors are moved, both safety doors are always coupled together and move as a single body, so that the safety door that is not being operated never becomes uncontrollable. In addition, when only one of the safety doors is moved, the moving safety door is of course one that is being operated by the operator, and therefore safety is achieved, and thus safety is attained in any case.

BRIEF DESCRIPTION OF THE DRAWINGS

FIGS. 2a-2c are structural drawings of the safety door according to one embodiment of the present invention;

DETAILED DESCRIPTION

Figure 1A:
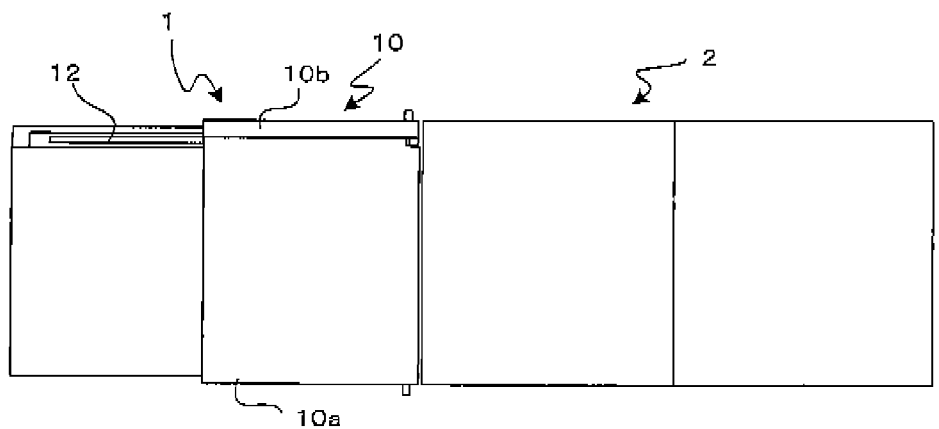
FIGS. 1a and 1b are schematic overall views showing plan and front views, respectively, of an injection molding machine provided with a safety door according to one embodiment of the present invention.
Figure 1B:
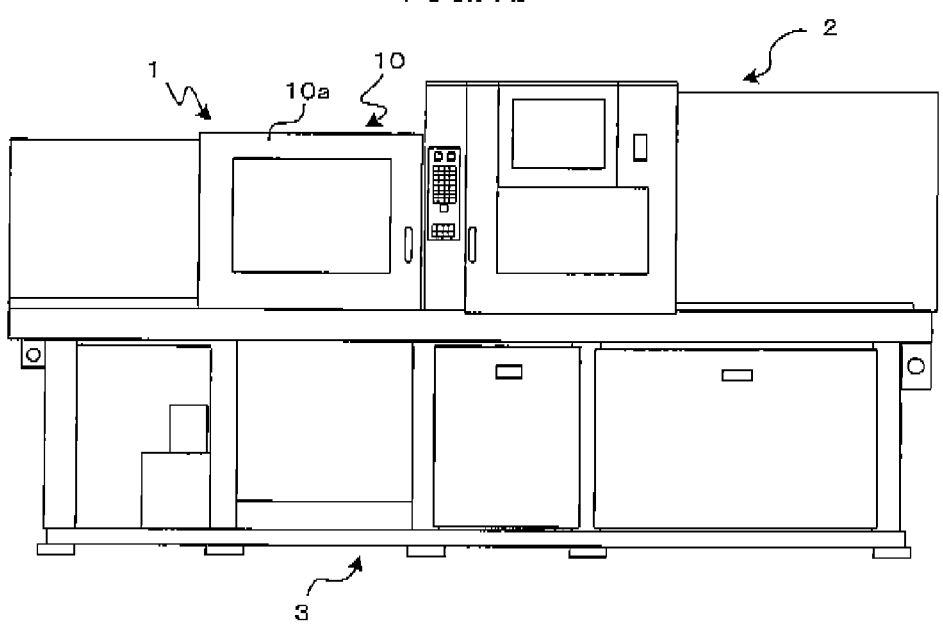

FIGS. 1a and 1b are schematic overall views showing plan and front views, respectively, of an injection molding machine provided with a safety door according to one embodiment of the present invention.

As shown in FIGS. 1a and 1b, a clamping unit 1 and an injection unit 2 are placed on a base 3 of the injection molding machine. A safety door device 10 is provided on the clamping unit 1. The safety door device 10 is configured so that a primary safety door 10a is provided on an operation side (front side) and a secondary safety door 10b is provided on a side opposite the operation side (rear side), in such a way that the primary safety door 10a and the secondary safety door 10b slide laterally in the drawing atop the base 3 so that the safety doors 10a, 10b can open and close. The primary safety door 10a is a safety door bent so as to open and close the front side and a top side.

FIGS. 1a and 1b show the clamping unit 1 closed. By moving the primary safety door 10a to the left in FIGS. 1a and 1b, the front and top are opened to enable a mold to be mounted or removed, a molded article to be removed form the mold, the clamping unit to be maintained, and so forth. In addition, by moving the secondary safety door 10b to the left in FIGS. 1a and 1b, the rear side is opened to similarly enable various operations to be performed on the clamping unit 1.

FIGS. 2a-2c illustrate the structure of the safety door 10, showing rear, plan, and front views, respectively, of the safety door 10. As noted previously, the safety door 10 is composed of a primary safety door 10a that covers the front and the top of the clamping unit 1 of the injection molding machine and opens and closes, and a secondary safety door 10b that covers the rear of the clamping unit 1 and opens and closes. The primary safety door 10a and the secondary safety door 10b can be freely opened and closed independently. In addition, these two safety doors 10a, 10b can be moved together as a single body by an engaging means 11. In FIGS. 2a-2c, both the primary safety door 10a and the secondary safety door 10b are shown partially open.

A guide member 12 that guides a roller 11c of the engaging means 11 in a direction in which the secondary safety door 10b opens and closes is located on the rear side of the clamping unit 1 of the injection molding machine. The guide member 12 forms a type of cam surface with respect to the roller 11c, such that, where the secondary safety door 10b is closed shut, the roller 11c guide surface is lowered.

It should be noted that 14a is a handle for opening and closing the primary safety door 10a and 14b is a handle for opening and closing the secondary safety door 10b. Reference numerals 15a, 15b denote transparent windows provided on the primary safety door 10a and the secondary safety door 10b for looking therethrough into the interior. In addition, reference numerals 16, 17 denote detection switches for detecting opening and closing of the primary safety door 10a. That the detection switches 16, 17 are provided only for the primary safety door 10a represents an effort to reduce costs. Reference numeral 13 denotes a stationary platen cover.

FIGS. 3a-3f are drawings illustrating the construction of the engaging means and opening and closing operations of the safety door 10. In addition, FIGS. 4a-4f show states of the primary safety door 10a and the secondary safety door 10b corresponding to the opening and closing operations of the safety door 10 shown in FIGS. 3a-3f.

The secondary safety door 10b has a projection 10b' bent inward from a top end of the closed side of the secondary safety door 10b, and a notched portion 10a' is provided in a top side member of the primary safety door 10a at a position corresponding to the projection 10b' (see FIG. 2b). A face of the notched portion 10a' is an abutting portion (first abutting portion) 18a that a stopper 18b abuts. The stopper 18b (second abutting portion) that abuts the abutting portion of the primary safety door 10a and is made of an elastic body such as rubber is provided on the projection 10b' of the secondary safety door 10b. An engaging portion 19 that engages the engaging means 11 to move the primary safety door 10a and the sec as a single body is formed on the notched portion 10a' of the primary safety door 10a.

Figure 3A:
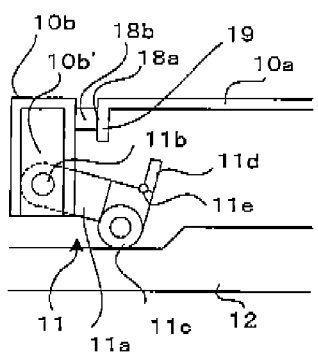
FIGS. 3a-3f are drawings illustrating a construction of engaging means and opening and closing operations of the safety door in the embodiment.

The engaging means 11 is composed of a lever 11a swingingly supported by a lever rotation supporter 11b provided on the projection 10b' of the secondary safety door 10b, the roller 11c rotatably supported at an end of the lever 11a and guided by the guide member 12, and a hinge member 11d. The hinge member 11d, in FIG. 3a, is urged clockwise about a hinge center of rotation 11e by urging means such as a spring, such that the rotation of the hinge member 11d is stopped at a rotation position projecting from the lever 11a and the hinge member 11d cannot rotate any further. Accordingly, the hinge member 11d cannot rotate any further in the clockwise direction in FIG. 3a from the protruding position shown in FIG. 3a, though it is capable of rotating counterclockwise against the force of the urging means such as a spring.

Figure 3B:
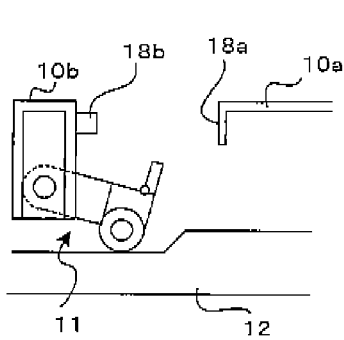
Figure 4A:
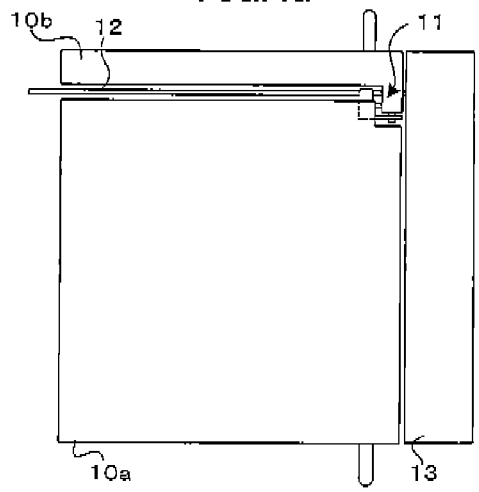
FIGS. 4a-4f show states of the opening and closing operations of the safety door in the embodiment.
Figure 4B:
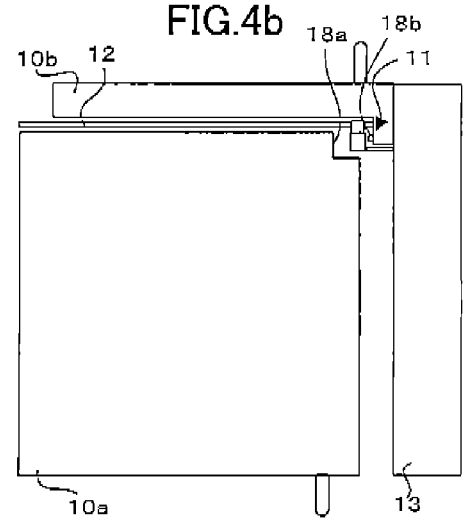

FIG. 3a and FIG. 4a show a state in which both the primary safety door 10a and the secondary safety door 10b are closed. In this state, since the guide surface of the guide member 12 is low, the weight of the lever 11a and the roller 11c causes the lever 11a of the engaging member 11 to swing about the lever rotation supporter 11b so as to create a state in which the roller 11c abuts the lowered guide surface of the guide member 12 at a low position. In this state, as shown in FIG. 3a, the hinge member 11d of the engaging means 11 and the engaging portion 19 of the primary safety door 10a do not engage, and as shown in FIG. 3b and FIG. 4b, the primary safety door 10a alone can be freely opened and closed separately. In other words, when the secondary safety door 10b is closed shut, the primary safety door 10a can be freely opened and closed separately from the secondary safety door 10b.

Figure 3C:
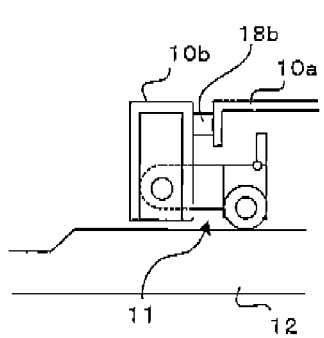

By contrast, when the secondary safety door 10b is opened from the state in which both the primary safety door 10a and the secondary safety door 10b are closed shut as shown in FIG. 3a and FIG. 4a, the stopper (second abutting portion) 18b pushes the first abutting portion 18a, which is a base of the engaging portion 19b of the notched portion 10a' of the primary safety door 10a, so that the primary safety door 10a opens together with the secondary safety door 10b. This is the state shown in FIG. 3c and FIG. 4c. In FIG. 3c and FIG. 4c, the roller 11c of the engaging means 11 moves to the high part of the guide member 12, the lever 11a is pushed up, the hinge member 11d and the engaging portion 19 of the primary safety door 10a engage, and further, the engaging portion 19 moves opposite the face of the secondary safety door 10b and the stopper (second abutting portion) 18b. As a result, so long as the secondary safety door 10b is not closed shut, if the primary safety door 10a is operated in the direction in which the primary safety door 10a opens, abutment of the engaging portion 19 and the hinge member 11 (the state shown in FIG. 3d) causes the secondary safety door 10b to open as well. If the primary safety door 10a is operated in a direction in which the primary safety door 10a closes, the first abutting portion 18a that is the base of the engaging portion 19 and the stopper (second abutting portion) 18b abut each other (the state shown in FIG. 3c) and the secondary safety door 10b also moves in the closing direction.

Conversely, if in the state shown in FIG. 3c and FIG. 4c the secondary safety door 10b is operated and the secondary safety door 10b is opened, the stopper (second abutting portion) 11b pushes the first abutting portion 18a of the primary safety door 10a (the state shown in FIG. 3c), moving the primary safety door 10a in the opening direction. If the secondary safety door 10b is operated in the closing direction, then the hinge member 11d and the engaging portion 19 abut each other (the state shown in FIG. 3d) and, since the hinge member 11 cannot rotate further in the clockwise direction from the protruding position, the hinge member 11d pushes the engaging portion 19 and moves the primary safety door 10a in the closing direction. In other words, so long as the secondary safety door 10b cannot be closed, if either the primary safety door 10a or the secondary safety door 10b is opened or closed, the other safety door also opens and closes, so that the primary safety door 10a and the secondary safety door 10b move as a single body and open and close.

When the primary safety door 10a is operated so as to open as shown in FIG. 3b and FIG. 4b from the state in which both the primary safety door 10a and the secondary safety door 10b are closed as shown in FIG. 3a and FIG. 4a, since the engaging portion 19 is not present between the hinge member id and the stopper 18b, the primary safety door 10a can be freely opened and closed independently of the secondary safety door 10b. In addition, when the secondary safety door 10b is operated from the state shown in FIG. 3b and FIG. 4b, as shown in FIG. 3e and FIG. 4e, in a range in which the hinge member 11d and the engaging portion 19 do not abut each other, the secondary safety door 10b can be freely opened and closed independently of the primary safety door 10a.

Figure 3D:
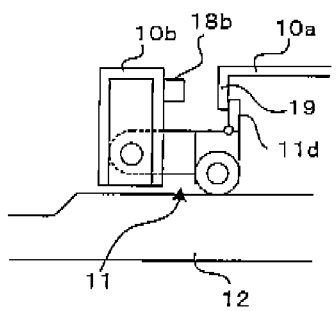
Figure 3E:
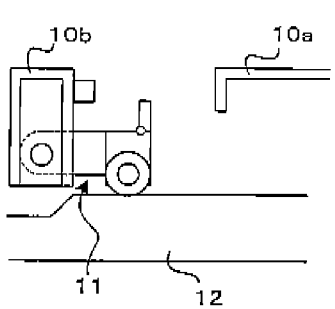
Figure 3F:
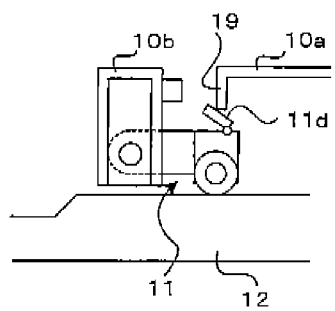
Figure 4C:
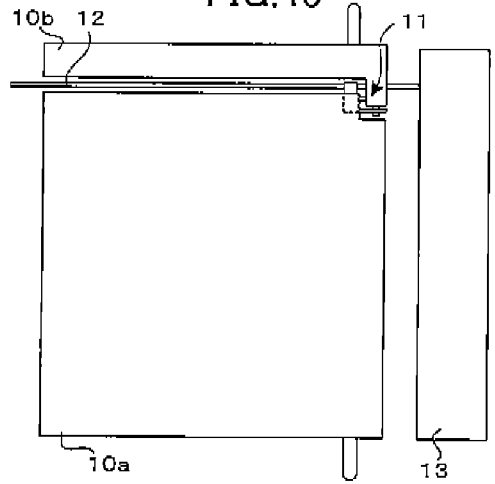
Figure 4D:
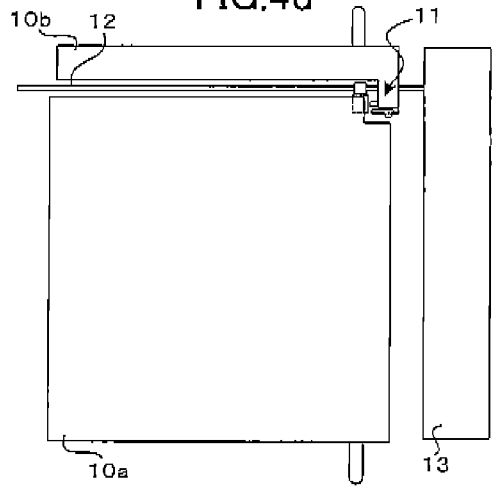
Figure 4E:
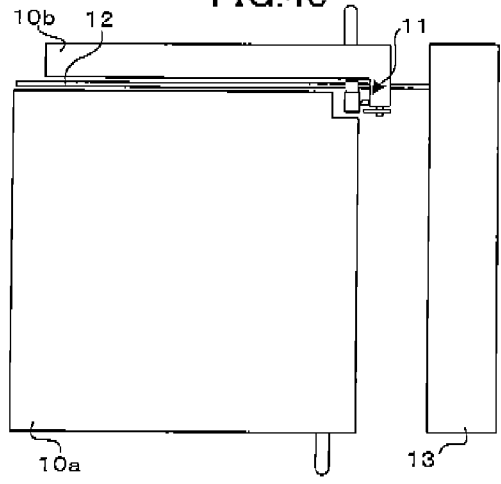
Figure 4F:
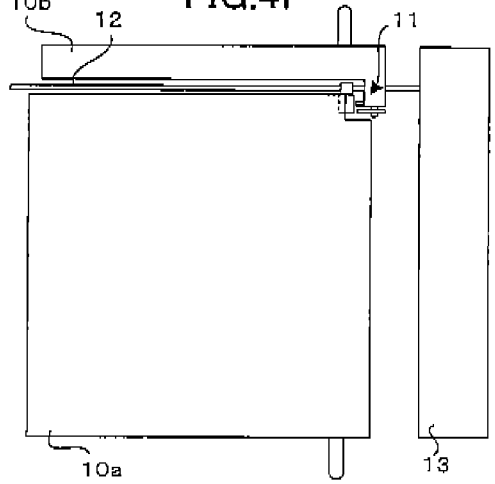

However, when the primary safety door 10a or the secondary safety door 10b is moved so that the hinge member 11d and the engaging portion 19 abut each other as shown in FIG. 3f and FIG. 4f from the state shown in FIG. 3e and FIG. 4e, since the hinge member 11d rotates in the counter-clockwise direction, the hinge member 11d is pushed over by the engaging portion 19, allowing the engaging portion 19 to pass and entering the states shown in FIGS. 3d and 4d or in FIG. 3c and FIG. 4c. After reaching this state, as described above, the primary safety door 10a and the secondary safety door 10b open and close as a single body until both are closed shut.

Thus, as described above, the primary safety door 10a and the secondary safety door 10b can be moved separately and opened and closed, and the primary safety door 10a and the secondary safety door 10b can be moved as a single body and the doors opened and closed. When the doors are moved as a single body, the primary safety door 10a and the secondary safety door 10b are coupled by the engaging means 11, and therefore when the safety door being operated is stopped the other safety door also stops, such that the safety door on the side that is not being operated does not continue to move under inertia and therefore safety can be achieved.

It should be noted that although in the embodiment described above the hinge member 11d is provided on the engaging means 11 and the engaging portion 19 is provided on the primary safety door 10a, alternatively these may be reversed, with the hinge member 11d provided on the primary safety door 10a and the engaging portion 19 provided on the engaging means 11.

Figure 5A:
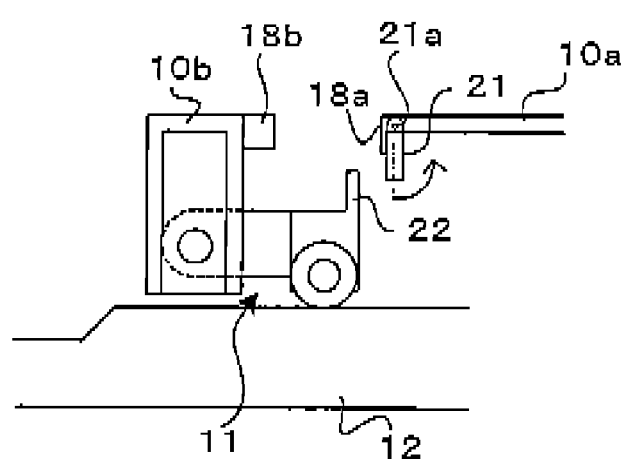
FIGS. 5a and 5b illustrate another aspect of the engaging means of the embodiment.
Figure 5B:
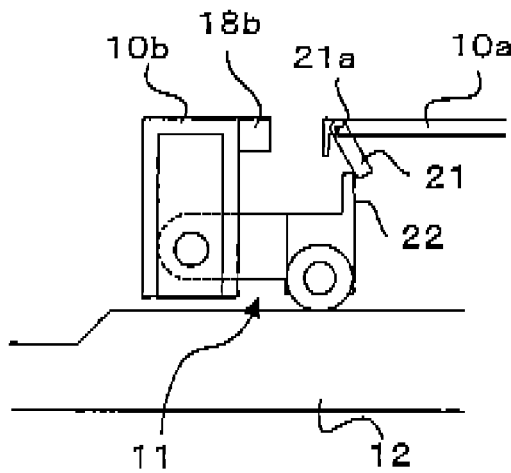

FIGS. 5a and 5b illustrate another aspect of the engaging means of the embodiment, that is, an example of the reversal described above. A swingable member 21 similar to the hinge member 11d described above is provided on the primary safety door 10a, with a projection 22 that engages the swingable member 21 provided on the engaging means 11. Then, the swingable member 21 is urged to the state shown in FIG. 5a, either under its own weight or by urging means such as a spring. Although the swingable member 21 can rotate about an axis 21a in a direction indicated by an arrow in FIG. 5a, it cannot rotate in the reverse direction. As a result, as shown in FIG. 5b, when the primary safety door 10a and the secondary safety door 10b are moved and the swingable member 21 moves from right to left in the drawing with respect to the projection 22, the swingable member 21 rotates and rides up over the projection 22. If the swingable member 21 rides up over the projection 22 and gets between the projection 22 and the secondary safety door 10b (the stopper 18b), then the swingable member 21 does not rotate even when it abuts the engaging portion 22 (the projection 22) and thus the primary safety door 10a and the secondary safety door 10b are coupled together and move as a single body. The remaining operations are the same as those described above with reference to FIGS. 3a-3f.

What is claimed is:

1. A safety door device of an injection molding machine, comprising:
   a primary safety door provided slidably to be opened/closed on a front side of the injection molding machine and having a first abutting member;
   a secondary safety door provided slidably to be opened/closed on a rear side of the injection molding machine and having a second abutting member, said first and second abutting members being abutting each other when said secondary safety door is opened so that said primary safety door opens together with said secondary safety door, and said first and second abutting members being abutting each other when said primary safety door is closed so that said secondary safety door closes together with said primary safety door;
   an engaging portion provided at said primary safety door; and
   an engaging member provided at said secondary safety door that engages/disengages with said engaging portion of said primary safety door, said engaging member being in a state unable to engage with said engaging portion when said secondary safety door is closed and being in a state able to engage with said engaging portion when said secondary safety door is opened,
   wherein said primary safety door and said secondary safety door are coupled with each other by engagement of said engaging member and said engaging portion when said first abutting member is brought closer to said second abutting member within a predetermined distance, with said engaging member being in the state able to engage with said engaging portion.

2. A safety door device of an injection molding machine according to claim 1, wherein a guide member for guiding said engaging member is provided in a sliding direction of said secondary safety door, and said engaging member is brought into the state unable to engage with said engaging portion and the state able to engage with said engaging portion as guided by said guide member.

3. A safety door device of an injection molding machine according to claim 2, wherein said engaging member comprises a lever that swings as guided by said guide member and a hinge provided at a distal end of said lever to swing to a protruding position by an urging force, and said hinge is swung by said engaging portion to pass said engaging portion when said first abutting member is moved relative to said second abutting member in a direction to abut each other, and is not swung by said engaging portion that is passed by the hinge when said first abutting member is move relative to said second abutting member in a direction remote from each other, with said engaging member in the state able to engage with the engaging portion.

4. A safety door device of an injection molding machine according to claim 2, wherein said engaging member comprises a lever that swings as guided by said guide member and a projection provided at a distal end of said lever, said engaging portion comprises a swingable member that swings to a protruding position by an urging force, and said swingable member is swung by said projection to pass said projection when said first abutting member is move relative to said second abutting member in a direction to abut each other, and is not swung by said projection that is passed by the swingable member when said first abutting member is moved relative to said second abutting member in a direction remote from each other, with said engaging member in the state able to engage with said engaging portion.

* * * * *